(12) United States Patent
Griggs et al.

(10) Patent No.: US 9,655,312 B1
(45) Date of Patent: May 23, 2017

(54) AGILE IRRIGATION CONTROLLER

(71) Applicant: Nelson Irrigation Corporation, Walla Walla, WA (US)

(72) Inventors: Travis A. Griggs, College Place, WA (US); Mark A. Bauman, College Place, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 557 days.

(21) Appl. No.: 14/205,140

(22) Filed: Mar. 11, 2014

(51) Int. Cl.
*A01G 25/16* (2006.01)

(52) U.S. Cl.
CPC .................................... *A01G 25/16* (2013.01)

(58) Field of Classification Search
None
See application file for complete search history.

(56) References Cited

U.S. PATENT DOCUMENTS

| | | | | |
|---|---|---|---|---|
| 4,937,732 A | * | 6/1990 | Brundisini | A01G 25/16 137/624.2 |
| 7,526,365 B1 | * | 4/2009 | Frerich | A01G 25/00 137/624.13 |
| 2004/0089346 A1 | * | 5/2004 | Sutardja | A01G 25/16 137/377 |
| 2009/0099701 A1 | * | 4/2009 | Li | A01G 25/16 700/284 |

* cited by examiner

*Primary Examiner* — Isaac T Tecklu
(74) *Attorney, Agent, or Firm* — Lowe Graham Jones PLLC

(57) ABSTRACT

An agile irrigation controller enables any number of programs to be added, limited only by available memory, and is similarly adaptable to control any number of valves or similar irrigation devices in a network. Stored programs within the memory include pointers to next programs in memory, linking the programs together. The memory further stores groups of valves, with links to additional groups of valves.

29 Claims, 9 Drawing Sheets

|  | 00:00 - 00:15 | 00:15 - 00:25 | 00:25 - 00:30 | 00:30 - 00:45 | 00:45 - 00:55 |
|---|---|---|---|---|---|
| A00103#1 | OPEN | | | | |
| D00189#1 | | | | OPEN | |
| D00189#2 | | | | OPEN | |
| D00189#3 | | OPEN | | OPEN | |
| D00189#4 | ACTIVE | ACTIVE | | ACTIVE | OPEN |
| DF0015#1 | ACTIVE | ACTIVE | | ACTIVE | ACTIVE |

FIG. 3

AGILE IRRIGATION CONTROLLER

FIELD OF THE INVENTION

This invention relates to devices for controlling irrigation valves and ancillary devices within a network.

BACKGROUND OF THE INVENTION

Accurate and reliable delivery of water has and continues to be a critical function for producing food for a growing population and for improving air quality (as in dust suppression). In addition, since the supply of water and electricity are limited, efficient methods of ensuring their delivery to the right place and at the right time continue to attract the attention of both designers as well as users.

Irrigation timers and controllers have been available for decades, and are an indispensable component in any state-of-the-art irrigation system. Many of these timers and controllers orchestrate the flow of water through these systems reliably and efficiently. However, many existing irrigation controllers utilize inflexible program architectures and are crafted for specific applications that are cumbersome when used in alternate applications.

The advent of wireless irrigation networks has opened the door for implementing irrigation control systems over a wider area and controlling a larger number of valves than their wired counterparts. The increase in the number of valves that a system can control also expands the complexity of the irrigation networks and complicates programming and sequencing of the irrigation valves and ancillary devices such as pumps within those networks beyond the capability of many state-of-the art controllers. Some controllers do indeed have the capacity to control large numbers of valves, but lack the structure to also control much simpler and limited systems.

What is needed then is an agile irrigation controller that addresses the above-mentioned problems by providing a flexible programming structure that can serve both simple and complex installations. This controller is the subject of the present patent application.

SUMMARY OF THE INVENTION

An irrigation controller in accordance with a preferred version of the invention includes a microprocessor, a memory coupled to the microprocessor, and a transceiver in communication with the microprocessor. A user interface is coupled to the microprocessor and configured to receive and store in the memory a program having program parameters, the program parameters being accessible by the microprocessor. The transceiver is adapted to send messages, based on the program parameters and under control of the microprocessor, to a plurality of remote terminal units each connected to one or more valves in an irrigation network.

In one version, the program parameters comprise a first group pointer associated with a set of first group parameters, the first group parameters having indicators for operational states of one or more valves in the irrigation network, and a next program pointer indicating a memory location for a next program.

The controller may store a plurality of programs, each one of the plurality of programs being associated with a separate first group pointers and next program pointer linking the groups together.

Preferably, each one of the plurality of programs is linked to another one of the plurality of programs through a next program pointer that includes an address location for the next program.

The irrigation controller is further able to store additional programs, in which the additional programs each have first group pointers and next group pointers, and further wherein one of the next program pointers is caused to point to the additional program to link the additional program to the previously stored programs.

The next program pointer for a final one of the plurality of programs includes a final program indicator representing that the final program is the last program in the memory.

In a preferred version, the final program indicator is a null value.

In some examples, the first group pointer further includes a valve set pointer and a next group pointer, the valve set pointer indicating location within the memory containing a table of valves assigned to the group.

The next group parameters in some examples comprise a final group indicator, the final group indicator representing that the final group is the last group in the memory.

In a preferred version, the final group indicator is a null value.

The first group parameters further can include a tally value indicating the number of valves present in the first group.

The program parameters further can include an iteration value indicating the number of times the program is to be repeated.

The program parameters can also include a schedule pointer value indicating the location in memory containing a set of schedule parameters.

The schedule parameters may include a day of week indicator, a start time, and a next schedule pointer.

The controller, in preferred versions, can be agile by enabling any number of programs to be added, and/or by allowing any number of groups to be added within a single program. Preferably, programs and groups are added in a fashion in which they are linked to one another through pointers to locations in memory associated with the programs and groups.

BRIEF DESCRIPTION OF THE DRAWINGS

Preferred and alternative examples of the present invention are described in detail below with reference to the following drawings:

FIG. 3 is a table of time-sequenced valves and relays in an example sequence in the wireless irrigation network;

DETAILED DESCRIPTION OF THE PREFERRED EMBODIMENT

Figure 1:
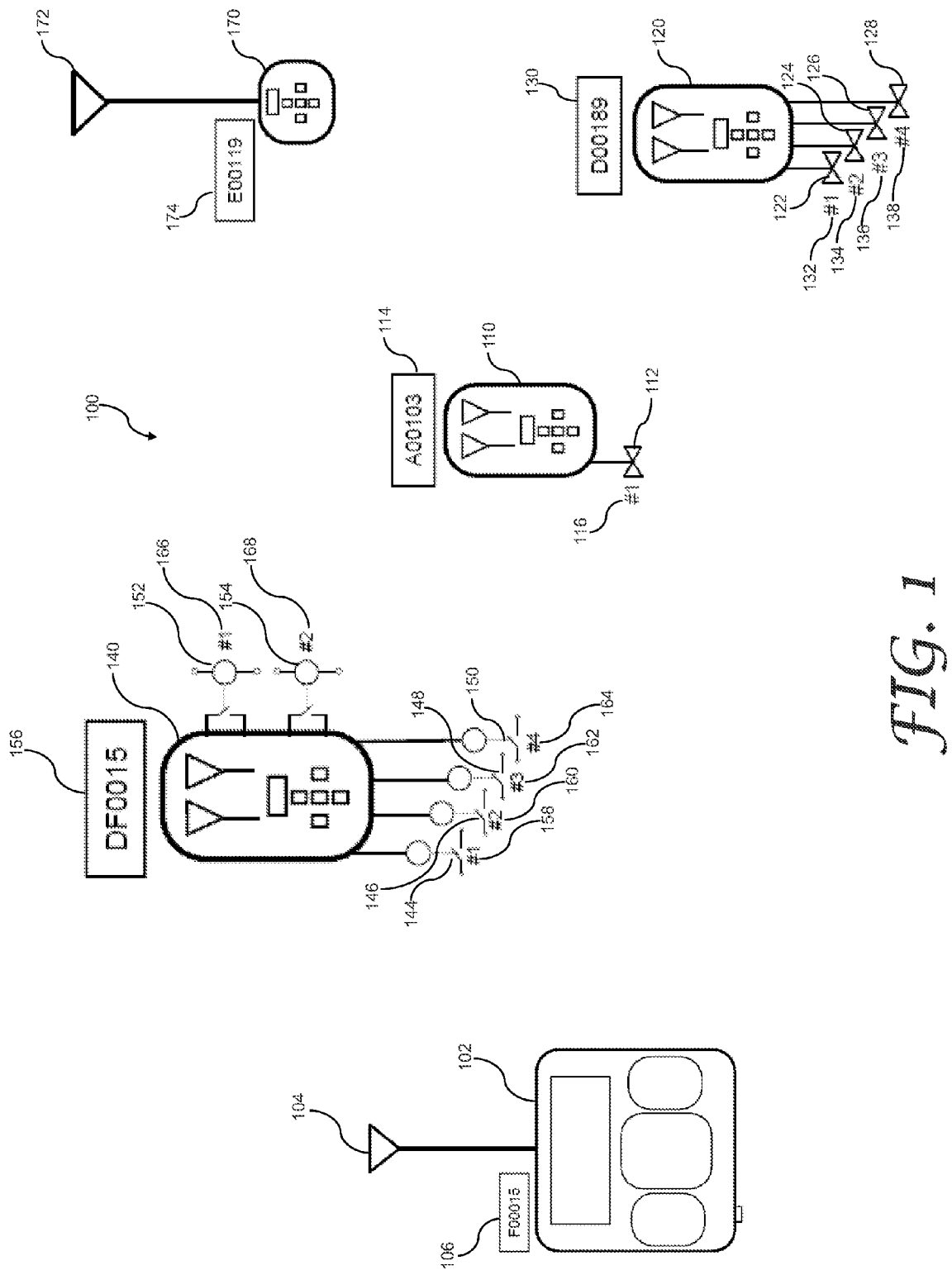
FIG. 1 is a simplified block diagram of a wireless irrigation network that is controlled by an agile irrigation controller and includes a plurality of remote terminal units.

Referring to FIG. 1, an exemplary wireless irrigation control network 100 is shown in a simplified form. The wireless irrigation control network 100 includes a plurality of devices that each includes a wireless transceiver that is configured to enable each of the devices to participate in the network 100. This participation includes but is not limited to sending and receiving control signals as well as sending and receiving sensor data. The devices may differ from one another in their abilities to send or receive, or in the types of data that may be sent or received. The construction and features of these devices will be discussed in further detail below.

An example of a preferred agile irrigation controller 102 is configured with a microprocessor (which may also be described as a microcontroller) and a memory that is connected to an internal wireless transceiver that is adapted to send and receive messages according to a protocol. The controller 102 is ideally configured to execute irrigation schedules or irrigation programs according to prescribed instructions provided by a user. The irrigation programs have a specific structure and are retained in memory within the controller 102 which will be discussed in further detail below.

The controller 102 is connected in signal transmission relation to an antenna 104 that is located and configured to communicate wirelessly with other devices in the network 100.

The controller 102 has a serial number 106 that is assigned at the time of manufacture and serves to uniquely identify the controller 102. The serial number 106 also serves as a network identifier and is used as a common link for all devices in the network 100.

The network 100 is architected to include a variety of types of devices and varying quantity to meet specific irrigation needs in various situations. By way of example, one of the devices in the network 100 is a single valve remote terminal unit (RTU) 110. The RTU 110 has a single output configured to connect to one valve 112. In a preferred embodiment, the valve 112 is a latching type, or bi-stable valve that requires energy only when changing state. The RTU 110 has a serial number 114 that is a unique number assigned during unit manufacture. The RTU 110 is configured so that the valve 112 can be identified in the network 100 by appending a valve number 116 to the serial number 114. In this manner, the controller 102 can reference the valve 112 by way of identification and specify its operation. For example, the valve 112 is identified in the network as A00103#1.

Another device in the network 100 is a quad valve RTU 120 that has four outputs that are each configured to connect valves 122, 124, 126 and 128 respectively. The RTU 120 has a serial number 130 that is a unique number assigned during unit manufacture. The RTU 120 is configured so that each of the valves 122-128 can be identified in the network 100 by appending a valve number 132, 134, 136, and 138 to the serial number 130. In this manner, the controller 102 can reference each of the valves 122-128 by way of identification and specify its operation. For example, the valve 122 is identified in the network as D00189#1, valve 124 is identified in the network as D00189#2 and so forth.

Yet another device in the network 100 is a relay RTU 140. In one embodiment, the RTU 140 has four relay contacts 144, 146, 148 and 150 and two inputs 152 and 154. The RTU 140 has a serial number 156 that is a unique number or identifier assigned during unit manufacture. The RTU 140 is configured so that each of the relay contacts 144-150 can be identified in the network 100 by appending a relay contact number 158, 160, 162 and 164 to the serial number 156. In this manner, the controller 102 can reference each of the relay contacts 158-164 by way of identification and specify its operation. For example, the relay contact 144 is identified in the network as DF0015#1, relay contact 146 is identified in the network as DF0015#2 and so forth. Similarly, the RTU 140 is configured so that each of the inputs 152 and 154 can be identified in the network 100 by appending an input number 166 and 168 to the serial number 156.

Finally, the network 100 also includes a repeater 170 that is configured to enhance or extend communication between the controller 102 and the RTUs 110, 120 and 140 when it becomes necessary. The repeater 170 should be located in communication range of the controller 102 or another repeater. The repeater 170 is connected to an external antenna 172, and has a unique serial number 174 assigned at the time of manufacture.

Figure 2:
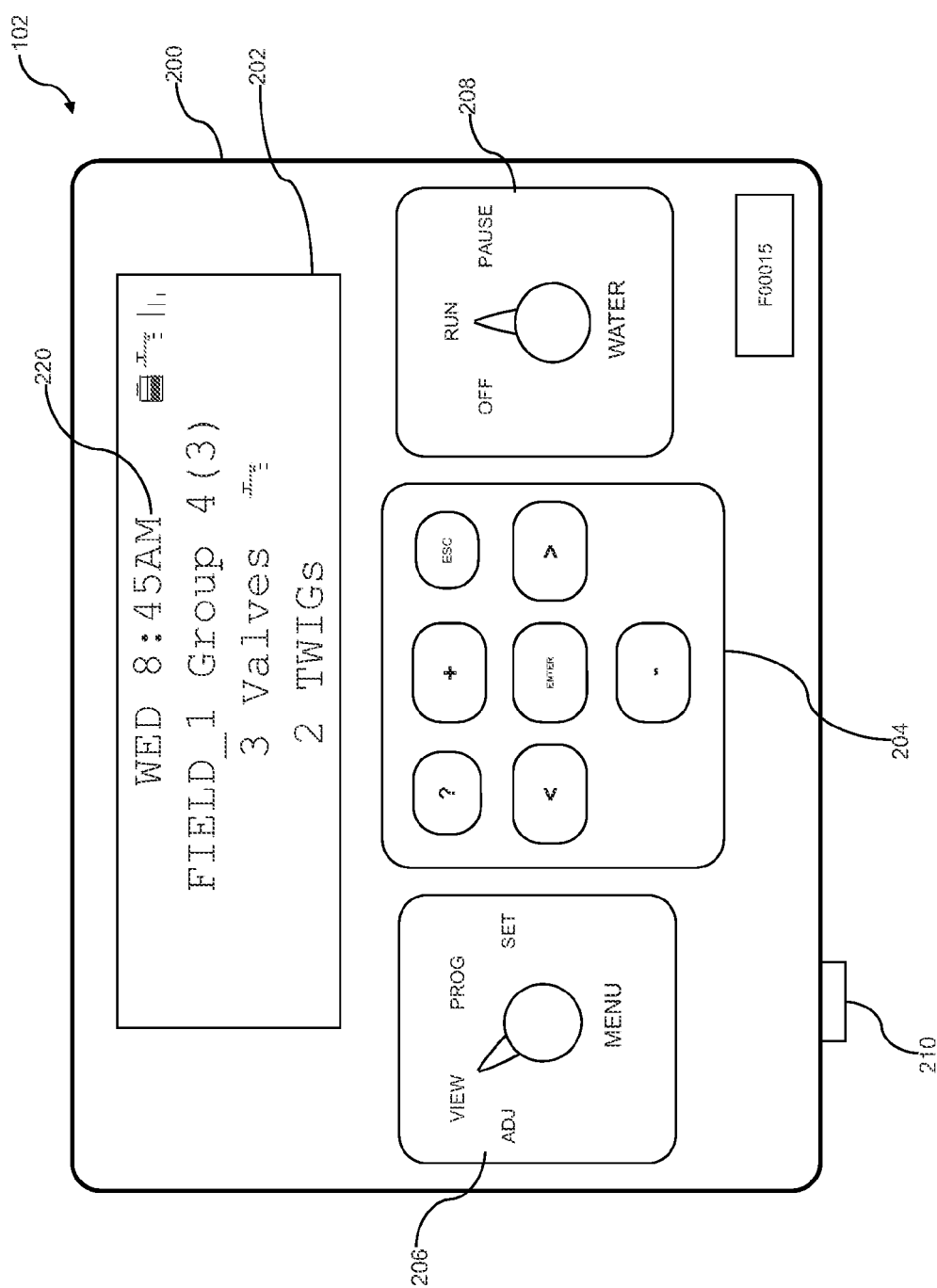
FIG. 2 is a simplified front view of one embodiment of an agile irrigation controller.

Now referring to FIG. 2, an embodiment of the agile irrigation controller 102 has a user interface 200 comprising a display 202, keypad 204, menu selector 206 and watering selector 208. The controller 102 contains a real-time clock that tracks a current local time value 220. The user interface 200 is crafted to provide a convenient mechanism to create irrigation schedules or programs and then adjust and execute these programs. These programs will be discussed in further detail below.

The controller 102 also includes a USB port 210 and a cellular modem port (not shown) that can be used to transfer information from other computers or mobile devices. In some examples, the USB port and the cellular modem port may be considered part of the user interface in that they can enable the transfer of one or more programs and related program parameters to the controller memory by a user. This information includes status and control data, programs and schedules. There are many other mechanisms and techniques that can be used to transfer information without departing from the scope of this invention.

Figure 9:
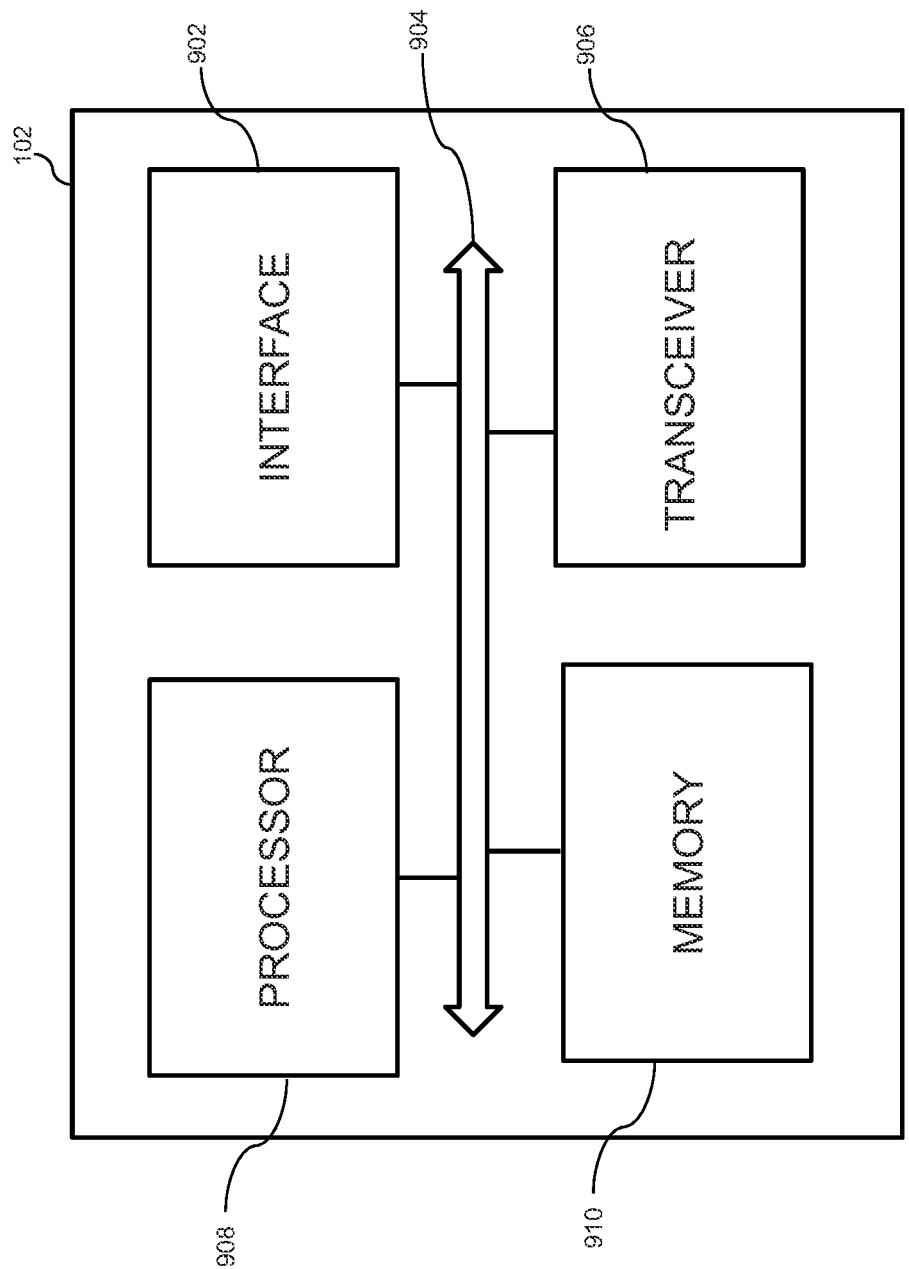
FIG. 9 is a block diagram of a preferred embodiment of an agile irrigation controller.

With reference to FIG. 9, a block diagram for a preferred configuration for a controller 102 is shown. The controller 102 includes a processor 908 (which may alternately be called a microprocessor or microcontroller) in communication over a bus 904 with a user interface 902, a memory 910, and a transceiver 906. The interface may comprise a display, keypad, menu selector, watering selector, and input/output means such as a USB or other jack.

For the purposes of this disclosure, a program is a prescriptive collection of structures herein referred to as groups, and wherein each group includes a list of valve or contact identifiers. Each group also includes time-based attributes that specify when the group will be active within the context of the program. The program can also include a plurality of start time or schedule structures that specify when the program will be started. These and other aspects of programs will be discussed in further detail below.

Now referring to FIGS. 1 and 3, an irrigation application requires that specific contacts be closed to enable or activate master valves or pumps and that specific valves be open to supply a flow of water to sprinklers or a zone of drip tape at specific times to ensure that a correct amount of water is applied for a proper amount of time and in a specific sequence.

By way of example, a table 300 represents an irrigation scenario, wherein a specific set of valves 302 are opened and relays activated with contacts closed to activate a pump 304 in a specific sequence during a specified time 306. In this example, we see that for time 00:00 to 00:15 that valve A00103#1 indicated by the numeral 112 (FIG. 1) should be open and the contact DF0015#1 referenced by the numeral 144 should be active or closed. It should be understood that the contact 144 is connected in power transmission relation to a pump (not shown) so that when the contact 144 is closed that the pump (not shown) becomes active. By inspection of the table 300, it should be understood that at the time 00:15 to 00:25 that valve A00103#1 should close while valve D00189#4 referenced by the numeral 128 (FIG. 1) should open and the contact DF0015#1 remains closed or active. From inspection, it should be apparent from the table 300 that the scenario indicates the opening or closing of the various valves, and the operation of the pump, in a similar manner until 00:55 when it is complete.

Figure 4:
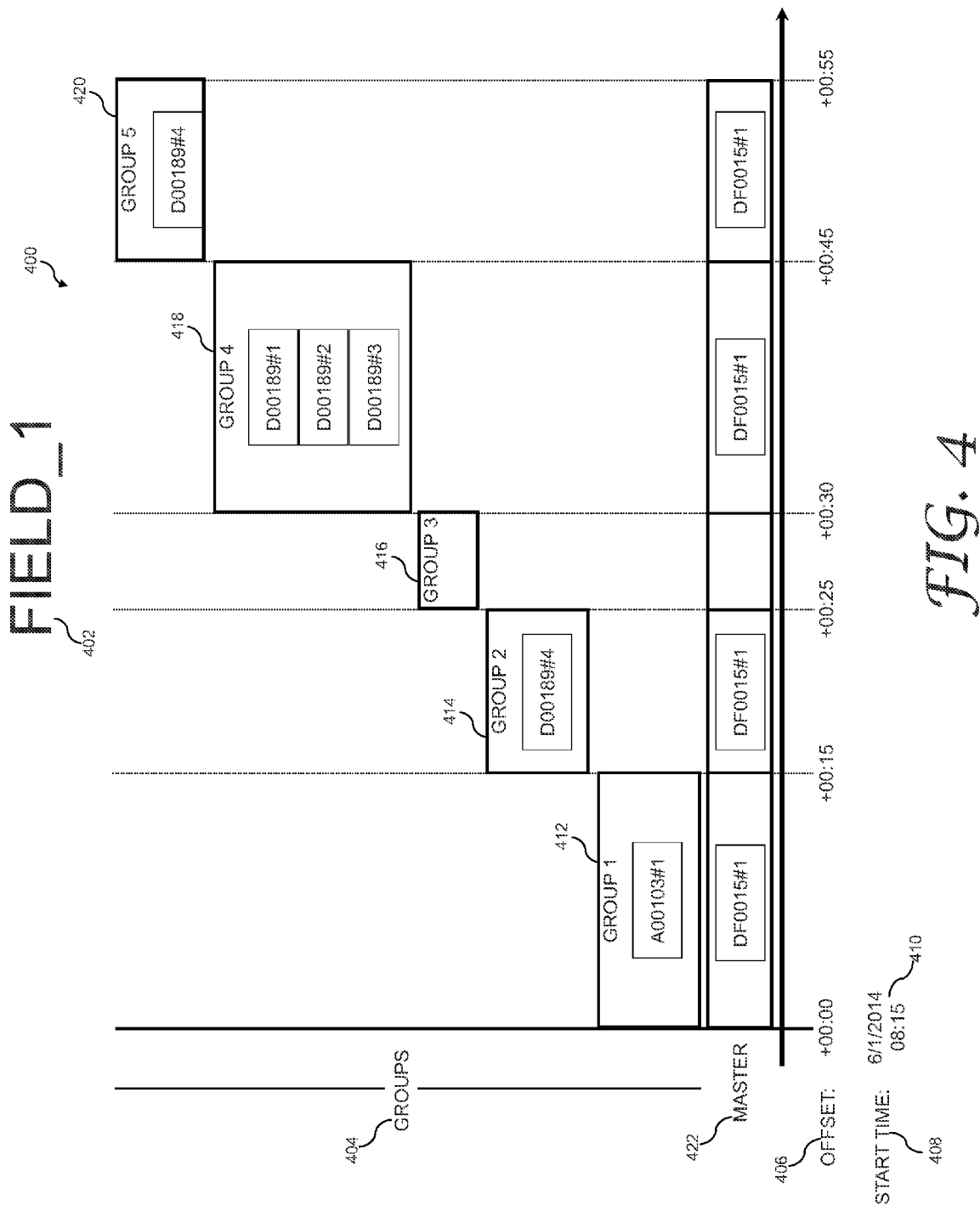
FIG. 4 is a graph of valves organized in groups and ordered in time in the example sequence.

One way to represent an irrigation scenario is to form a prescription of the scenario in the form of a program. In FIG. 4, a representation of an example program 400 based on the scenario described by table 300 (FIG. 3) is illustrated in graphical form. Here the program 400 has a name 402, as an example, as "FIELD_1." The name 402 is a tag that can be used to reference the program from the user interface 200 (FIG. 2) or from a remote computer or mobile device.

The program 400 includes a plurality of groups 404. Each group 404 is specified to start and end at a specific offset time that is referenced relative to a start time 408 for the program 400. In this example, the program 400 would begin at 08:15 on 6/1/2014 as is indicated by the numeral 410. A group 1 designated by the numeral 412 includes valve A00103#1 that will be active during the time offset 406 from +00:00 to +00:15. A group 2 designated by the numeral 414 includes valve D00189#4 that will be active during the time offset 406 from +00:15 to +00:25. A group 3 designated by the numeral 416 is empty and does not include any valves, so no valves will be active during the time specified, but it will still be active during the time offset 406 from +00:25 to +00:30. A group 4 designated by the numeral 418 includes valves D00189#1, D00189#2 and D00189#3 that will be active during the time offset 406 from +00:30 to +00:45. A group 5 designated by the numeral 420 includes valve D00189#4 that will be active during the time offset 406 from +00:45 to +00:55.

In the example program 400, all the groups follow in succession with no overlap. However, an underlying programming structure utilized by the controller 102 (FIGS. 1 and 2) is flexible and can accommodate overlapping groups and staggering of groups and will be discussed in further detail later in this specification.

The program 400 may also include a valve or relay master 422. The controller 102 (FIG. 2) is configured so that the master 422 is commanded to be active whenever the program 400 has any valves that are open. In this example, the master relay DF0015#1 is active with its contact closed while groups 1, 2, 4 or 5 are active. The valve or relay master 422 is associated with the program 400 during configuration of the controller 102 (FIG. 2) and will be discussed in further detail below.

The program 400 and associated parameters can be entered, retained and executed from a memory within the controller 102 (FIG. 2). This memory is organized within the controller 102 (FIG. 2) through a series of linked structures that will now be discussed.

Figure 5:
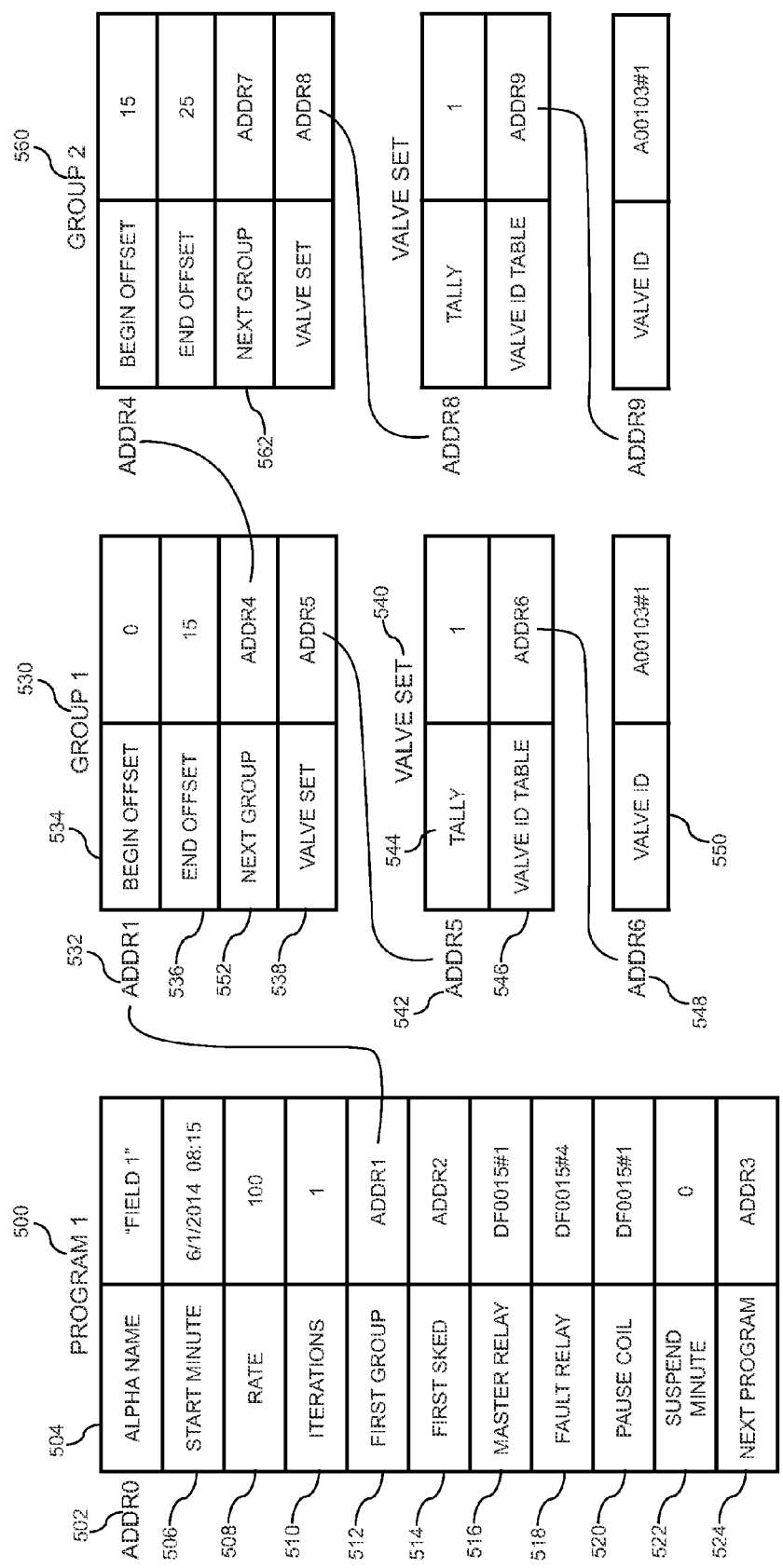
FIG. 5 is a simplified block diagram of a memory allocation within the agile irrigation controller for an irrigation program containing the first two groups that follows the example sequence.
Figure 6:
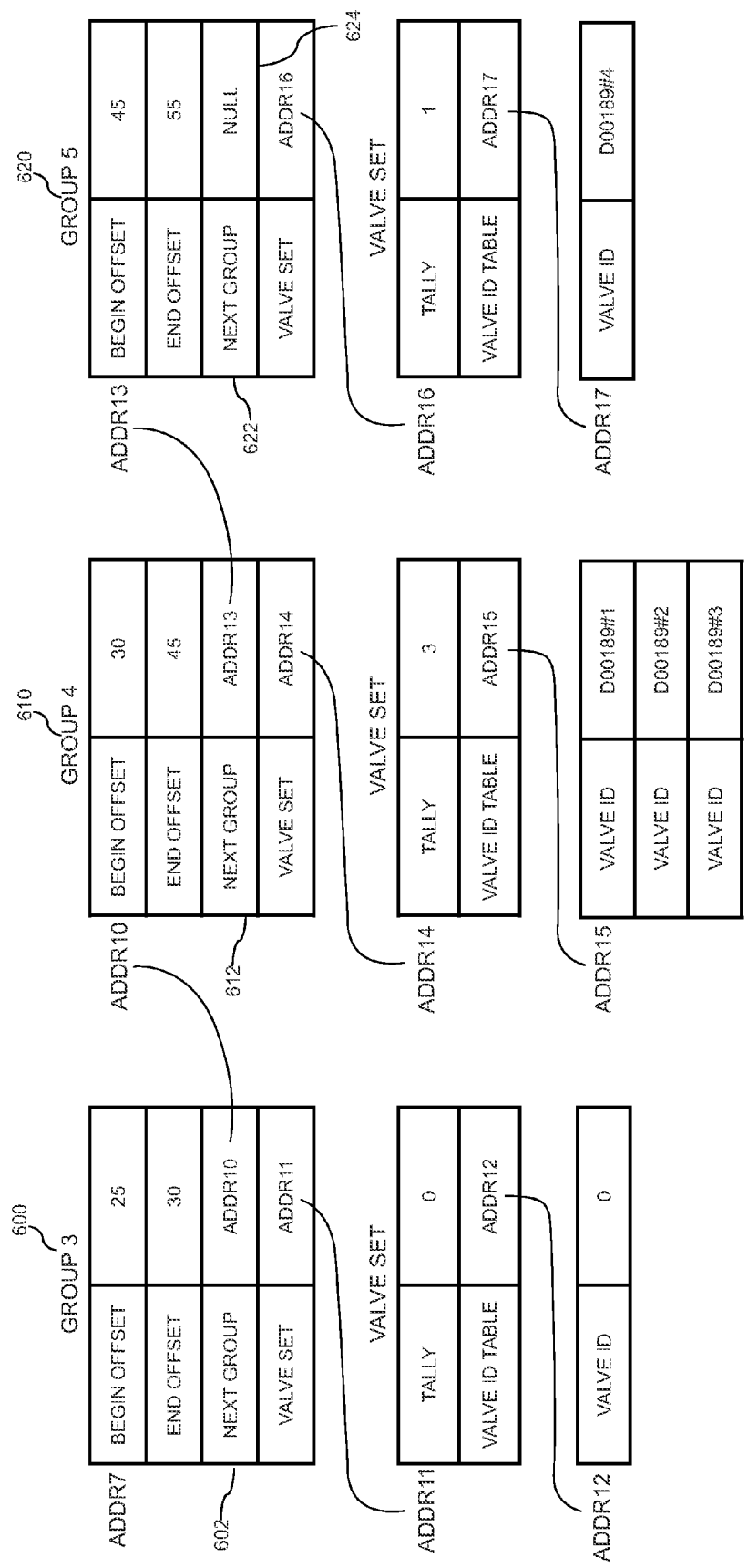
FIG. 6 is a simplified block diagram of a memory allocation within the agile irrigation controller for the irrigation program in FIG. 5 for three groups of the irrigation program to complete the example sequence.

Referring to FIGS. 2, 5 and 6, a first program structure 500 is stored at a memory location 502. This structure 500 includes a tag or alpha name 504 specified by a user to label the program. The structure 500 also includes a start minute 506 that is a record of the time that the program started.

A rate 508 is also recorded within the structure 500 and represents a time scaling value wherein a value of one hundred instructs the controller 102 to interpret the structure 500 to run at a normal pace. A rate 508 of two hundred would instruct the controller 102 to interpret the structure 500 to run a pace that was twice the normal pace and so on.

The structure 500 also includes an iteration value 510 that is interpreted by the controller 102 to determine how many times the structure 500 should be repeated. In one embodiment, an iteration value 510 of zero is interpreted by the controller 102 to mean that the structure 500 will repeat indefinitely.

Continuing to refer to FIGS. 2, 5 and 6, the structure 500 also contains a first group address location or pointer 512 indicating the starting location of the first group or group 1 in memory. The pointer 512 instructs the controller 102 where to locate parameters for group 1 and will be discussed in further detail below. For the purposes of this disclosure, it should be understood that the program structure 500 includes by extension all linked or referenced structures throughout the controller 102.

The structure 500 also contains a first schedule address location or pointer 514 indicating the starting location of the first schedule in memory. The pointer 514 instructs the controller 102 where to locate parameters for the first schedule and will be discussed in further detail below.

The structure 500 also includes a master identifier or master relay identification number 516 that is operated by the controller 102. In one embodiment, the controller 102 is configured so that the master relay indicated by the number 516 will become active anytime the program structure 500 instructs the controller 102 to open any valves or when any valves with program structure 500 are open.

A fault relay identification number 518 is included in the structure 500. In one embodiment, the controller 102 is configured to activate the fault relay indicated by the number 518 whenever the controller 102 is unable to control or verify the state of an active valve within the program structure 500.

The program structure 500 includes a pause coil identification number 520 that is queried by the controller 102. In one embodiment, the controller 102 is configured to halt or pause operation of the program structure 500 when the pause coil indicated by the number 520 is active.

A suspend minute value 522 is included in the program structure 500. In one embodiment, the controller 102 is configured to make the suspend minute value 522 equal to the current time value 220 when the program structure 500 is placed into a suspended or paused state. The controller 102 is configured to detect a change from a paused to a running state, which can be understood as a resume request. When this change is detected, the controller 102 is further configured to compute a difference between the current time value 220 and the suspend minute value 522 and to add this difference to the start minute 506. The controller 102 then is configured to set the suspend minute value 522 to zero once the start minute 506 has been updated. In this manner, the program structure 500 will become active in a state that is identical to a state that occurred when the suspend minute was initially written.

Finally, the program structure 500 also contains a next program address location or pointer 524 indicating the location of the next program in memory.

Still referring to FIGS. 2, 5 and 6, a group structure 530 is located in memory within the controller 102 at a memory location indicated by the numeral 532. This location is identical to the first group pointer 512. The group structure 530 includes a begin offset value 534 and an end offset value 536. The controller 102 is configured to evaluate whether a group is active or inactive based on a measure of the current time as well as program and group parameters. Specifically, the controller 102 is configured to designate a group as active only when the current time value 220 is greater than or equal to a sum of the program start minute 506 and the begin offset value 534, and is less than a sum of the program start minute 506 and the end offset value 536.

The group structure 530 also includes a valve set address or pointer 538 indicating a memory location of a valve set structure 540. This valve set structure 540 is located at an address indicated by the numeral 542 that is equal to the pointer 538 value. The valve set structure 540 includes a tally value 544 that is equal to a count of a number of valves or other devices that are present in the group. The structure 540 also includes a valve table address or pointer 546 indicating a starting location where individual valve identification numbers are stored within the controller 102. The address indicated by the numeral 548 represents the location of a valve table associated with the group structure 530. Here, individual valve identification numbers 550 are stored in sequential order whose depth is defined by the tally value 544. The controller 102 is configured to activate any valves that are present in the group when the group is active.

The group structure 530 includes a next group address or pointer 552 utilized by the controller 102 to locate a next group, which by way of example is another group structure 560. Following the example further, the group structure 560 includes a next group address or pointer 562 that specifies a location for yet another group structure 600 (see FIG. 6), which includes a next group address or pointer 602 that specifies the location of yet another group structure 610. As expected, the group structure 610 also contains a next group address or pointer 612 that specifies the location of yet another group structure 620. Finally, the group structure 620 contains a next group address or pointer 622. By way of example, the pointer 622 has a value equal to NULL 624 that is interpreted by the controller 102 to terminate the chain and signal that the group structure 620 is a final group in the program structure 500.

By careful examination of FIGS. 1, 5 and 6 and consideration of the previous discussion, it should be apparent that the controller 102 is configured to interpret the program structure 500 to control valves and other devices such as relays in the network 100. In FIGS. 5 and 6, example values have been provided to further illustrate the configuration of the program structure 500. The controller 102, when configured in the manner described above, will interpret the program structure 500 using the example values provided, and will control the network 100 in a manner consistent with the table 300 shown in FIG. 3 and the graph 400 shown in FIG. 4.

The number of groups in a program structure could be as few as zero and as many as could fit in memory in the controller 102. Yet further, the span of time that a program could be active and run can be as short as zero or as long as decades of years. Finally, the number of valves contained in each group could be as small as zero or as many as memory in the controller 102 would allow. In this manner, the program structure 500 is flexible or agile and enables efficient utilization of scarce memory resources while accommodating either a small number of very large program structures or a large number of smaller program structures or a vast number of intermediate combinations.

Figure 7:
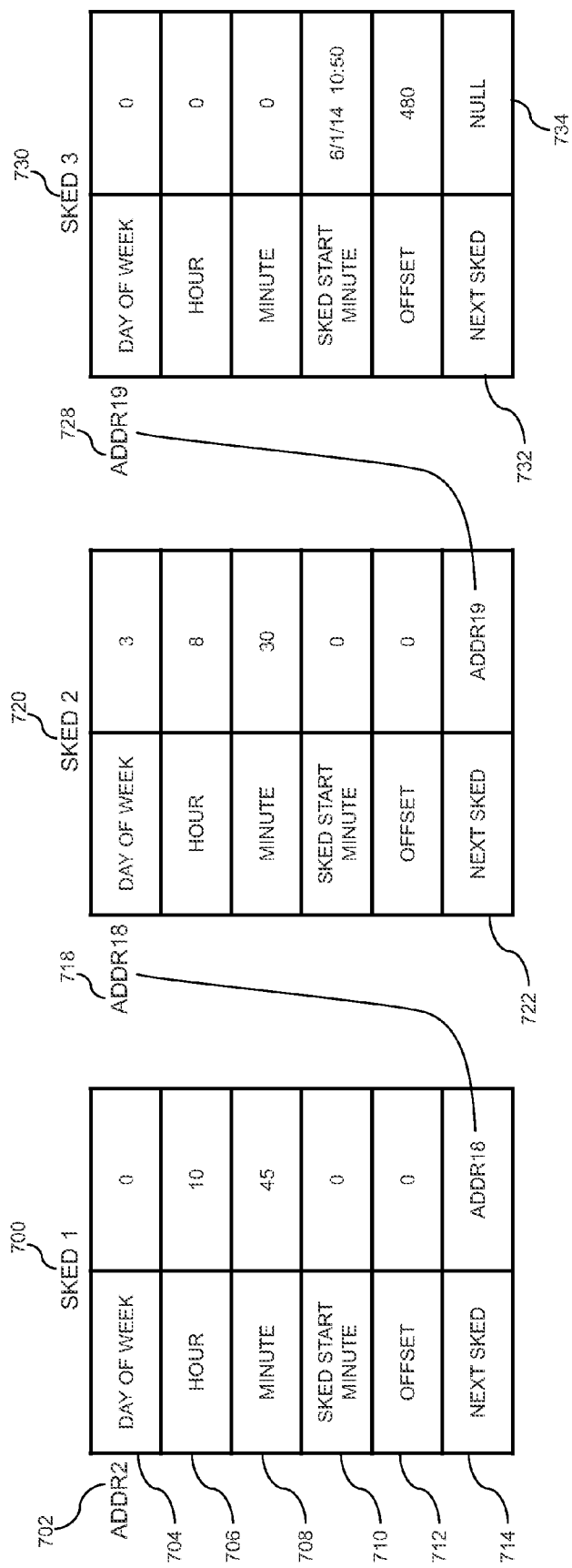
FIG. 7 is a simplified block diagram of a memory allocation for three schedules for the irrigation program that follows the example sequence.

Referring now to FIGS. 2, 5 and 7, the program structure 500 includes the first schedule pointer 514 that specifies a location 702 in memory within the controller 102 wherein a first schedule structure 700 is situated. The controller 102 is configured to evaluate parameters within the schedule structure 700 using the current time 220 and equate the start minute 506 of the program structure 500 to the current time 220 to initiate program operation. In this manner, the schedule structure 700 represents and is interpreted by the controller 102 as a program start time.

The schedule structure 700 includes a day of week value 704, an hour value 706, and a minute value 708. The controller 102 is configured to compare the current time value 220 with the values 704-708 to determine if there is a match. If there is a match, then the start minute 506 of the program structure 500 will be updated as described above. When the day of week value 704 is equal to zero, the controller 102 is configured to determine if only the hour or minute match the current time value 220. In this manner, a daily start time is realized.

The schedule structure 700 further includes a schedule start minute 710 and an offset 712. The controller is configured to record the current time value 220 in the schedule start minute 710 location when the schedule is created. The controller 102 is further configured to compute a difference between the current time value 220 and the scheduled start minute 710 and divide this difference by the offset 712. If a remainder value stemming from this division operation is zero, then the start minute 506 is set equal to the current time value 220, causing the program structure 500 to become active. In this manner, a program can be repeatedly started at an interval equal to the offset value 712.

Finally, the schedule structure 700 includes a next schedule address or pointer 714 indicating a memory location 718 within the controller 102 where a next schedule structure 720 is located. This schedule structure 720 contains a next schedule address or pointer 722 indicating a memory location 728 within the controller 102 where a next schedule structure 730 is located. This next schedule structure 730 contains a next schedule address or pointer 732. By way of example, the pointer 732 has a value equal to NULL 734 wherein the controller is configured to interpret this to signal that the structure 730 is the final schedule structure. One skilled in the art would recognize that the program structure 500 could link to as few as zero schedule structures or as great as any number of structures that can fit within the controller 102 itself.

From the discussion above, and by careful examination of FIGS. 2, 5 and 7 and by way of example using the values shown, it should be apparent that controller 102 is configured by the schedule structure 700 to start the program structure 500 every day at 10:45. Further, the controller 102 is configured in this example by the schedule structure 720 to start the program structure 500 on Tuesday at 08:30. Yet further, the controller 102 is configured in this example by the schedule structure 730 to start the program structure 500 at 10:50 on 6/1/2014 and to continue to restart every 480 minutes.

Other parameters could be added to the schedule structures 700, 720, and 730 without departing from the scope of this invention. For example, day of the month, month and year could be added to provide a longer range monthly and yearly calendar.

Figure 8:
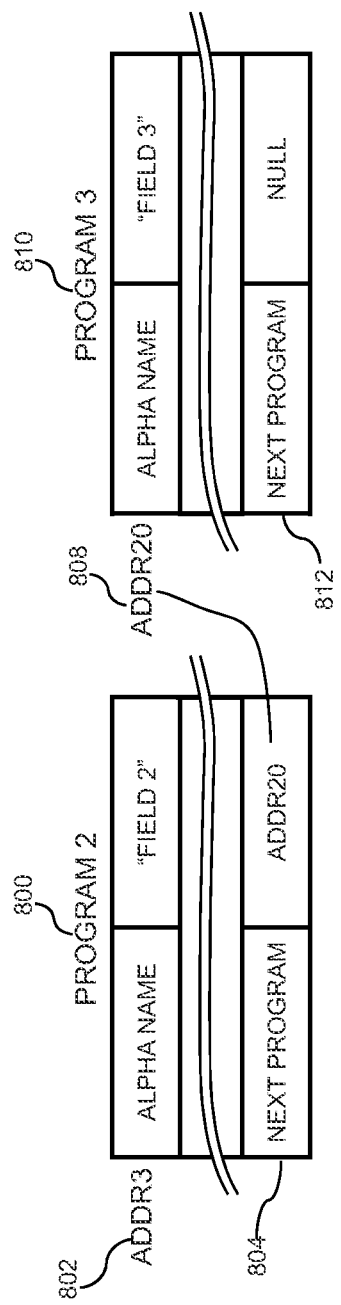
FIG. 8 is a simplified block diagram of a memory allocation within the agile irrigation controller for two additional programs.

Referring now to FIGS. 5 and 8, the program structure 500 includes the next program pointer 524 that refers to a memory location generally indicated by the numeral 802 that represents the starting location of a next program structure 800. This program structure 800 follows the template of the structure 500, and similarly has a next program address or pointer 804 having a value equal to the address of a memory location indicated by a numeral 808. This memory location 808 is the starting point for yet another program structure 810. Similarly, the structure 810 contains a next program address or pointer 812. In this example, the pointer 812 has a value equal to NULL, wherein the controller 102 is configured to interpret the NULL to mean that the program structure 810 is the last program in memory.

There can be as few as zero program structures or as many as can fit within the memory of the controller 102. Further, the controller 102 is configured to operate any number of program structures simultaneously, so very complex irrigation patterns can be accomplished.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An irrigation controller, comprising:
   a microprocessor;
   a memory coupled to the microprocessor;
   a transceiver in communication with the microprocessor;
   a user interface coupled to the microprocessor and configured to receive and store in the memory a plurality of irrigation scheduling programs having program parameters, the program parameters being accessible by the microprocessor;
   the transceiver being adapted to send messages, based on the program parameters and under control of the microprocessor, to a plurality of remote terminal units each connected to one or more valves in an irrigation network;
   wherein the program parameters for each of the plurality of irrigation scheduling programs comprise:
      a first group pointer pointing to a location in the memory associated with a set of first group parameters;
      a next program pointer pointing to a location in the memory associated with a next irrigation scheduling program; and
      a program start time value;
   wherein the set of first group parameters comprises:
      a valve set pointer;
      a next group pointer pointing to a location in the memory associated with a set of next group parameters;
      a begin offset value; and
      an end offset value;
   wherein the valve set pointer points to a location in the memory associated with a structure for one or more of the one or more valves in the irrigation network.

2. The irrigation controller of claim 1, wherein the next program pointer for a final one of the plurality of programs comprises a final program indicator, the final program indicator representing that the final irrigation scheduling program is the last irrigation scheduling program in the memory.

3. The irrigation controller of claim 2, wherein the final irrigation scheduling program indicator is a null value.

4. The irrigation controller of claim 1, wherein the next group pointer points to a set of next group parameters comprising a final group indicator, the final group indicator representing that the final group is the last group in the memory.

5. The irrigation controller of claim 4, wherein the final group indicator is a null value.

6. The irrigation controller of claim 1, further comprising a real time clock, wherein the controller is configured to activate the one or more valves indicated by the valve set pointer when a current time value of the real time clock is greater than or equal to the sum of the begin offset value and the program start time and is less than or equal to the sum of the end offset value and the program start time.

7. The irrigation controller of claim 6, wherein the user interface further includes a pause request, and wherein the program parameters further comprise a suspend minute value, wherein the microprocessor is further configured to:
   cause the suspend minute to be equal to a first time value when a pause request is detected by the irrigation controller;
   determine a second time value when a resume request is detected;
   compute a difference between the first time value and a second time value; and
   add the computed difference to the start minute.

8. The irrigation controller of claim 6, wherein the program parameters further comprise a master identifier.

9. The irrigation controller of claim 6, wherein the program parameters further comprise a fault identifier.

10. The irrigation controller of claim 1, wherein the user interface comprises a display and a keypad.

11. The irrigation controller of claim 1, wherein the user interface comprises a Universal Serial Bus (USB) port.

12. The irrigation controller of claim 1, wherein the one or more valves are identified in the memory by an identifier in the form of a combination of remote terminal unit serial number and a valve number.

13. An irrigation controller, comprising:
   a microprocessor;
   a memory coupled to the microprocessor;
   a transceiver in communication with the microprocessor;
   a user interface coupled to the microprocessor and configured to receive and store in the memory an irrigation scheduling program having program parameters, the program parameters being accessible by the microprocessor;
   the transceiver being adapted to send messages, based on the program parameters and under control of the microprocessor, to a plurality of remote terminal units each connected to one or more valves in an irrigation network;
   wherein the program parameters comprise:

a first group pointer associated with a set of first group parameters, the set of first group parameters associating one or more valves in the irrigation network; and a next irrigation scheduling program pointer indicating a memory location for a next program.

14. The irrigation controller of claim 13, wherein the irrigation scheduling program comprises a plurality of irrigation scheduling programs, the first group pointer comprises a plurality of first group pointers, and the next program pointer comprises a plurality of next program pointers, each one of the plurality of programs being associated with a separate one of the first group pointers and the next program pointers.

15. The irrigation controller of claim 14, wherein each one of the plurality of irrigation scheduling programs is linked to another one of the plurality of irrigation scheduling programs through one of the plurality of next program pointers.

16. The irrigation controller of claim 13, wherein stored programming instructions contained in the memory are operable by the microprocessor to cause the microprocessor, through inputs received by the user interface, to store an additional irrigation scheduling program, the additional irrigation scheduling program having an additional first group pointer and an additional next group pointer, and further wherein one of the plurality of next program pointers is caused to point to the additional irrigation scheduling program.

17. The irrigation controller of claim 13, wherein the next program pointer for a final one of the plurality of irrigation scheduling programs comprises a final program indicator, the final program indicator representing that the final irrigation scheduling program is the last irrigation scheduling program in the memory.

18. The irrigation controller of claim 17, wherein the final program indicator is a null value.

19. The irrigation controller of claim 13, wherein the first group pointer further comprises a valve set pointer and a next group pointer, the valve set pointer indicating a location within the memory containing a table of valves assigned to the group.

20. The irrigation controller of claim 19, wherein the next group pointers points to a set of next group parameters comprising a final group indicator, the final group indicator representing that the final group is the last group in the memory.

21. The irrigation controller of claim 20, wherein the final group indicator is a null value.

22. The irrigation controller of claim 19, wherein the set of first group parameters further comprise a tally value indicating the number of valves present in the first group.

23. The irrigation controller of claim 13, wherein the program parameters further comprise an iteration value indicating the number of times the program is to be repeated.

24. The irrigation controller of claim 13, wherein the program parameters further comprise a schedule pointer value indicating the location in memory containing a set of schedule parameters.

25. The irrigation controller of claim 24, wherein the schedule parameters include a day of week indicator, a start time, and a next schedule pointer.

26. The irrigation controller of claim 24, wherein the set of schedule parameters comprises a plurality of sets of schedule parameters, each of the sets of schedule parameters including a day of week indicator, a start time, and a next schedule pointer, wherein one of the next schedule pointers is a null pointer, and further wherein each of the remaining next schedule pointers indicates a different one of the plurality of sets of schedule parameters.

27. The irrigation controller of claim 13, wherein the program parameters further comprise a master identifier, and wherein the irrigation controller is configured to activate a device associated with the master identifier whenever any of the valves associated with the group parameters are indicated as being open.

28. The irrigation controller of claim 13, wherein the microprocessor comprises a real time clock, the program parameters comprise a start minute value, and the set of first group parameters comprise a begin offset value and an end offset value.

29. The irrigation controller of claim 13, wherein the program parameters further comprise a fault identifier, and wherein the irrigation controller is configured to activate a device associated with the fault identifier whenever an error is detected in any of the valves associated with the group parameters.

* * * * *